US009740663B2

(12) United States Patent
Tomar et al.

(10) Patent No.: US 9,740,663 B2
(45) Date of Patent: Aug. 22, 2017

(54) PROCESSING DEVICE AND METHOD FOR PERFORMING A STAGE OF A FAST FOURIER TRANSFORM

(71) Applicants: Rohit Tomar, Edinburgh (GB); Maik Brett, Taufkirchen (DE); Tejbal Prasad, Greater Noida (IN); Gurinder Singh, Ellenabad (IN)

(72) Inventors: Rohit Tomar, Edinburgh (GB); Maik Brett, Taufkirchen (DE); Tejbal Prasad, Greater Noida (IN); Gurinder Singh, Ellenabad (IN)

(73) Assignee: NXP USA, Inc., Austin, TX (US)

( * ) Notice: Subject to any disclaimer, the term of this patent is extended or adjusted under 35 U.S.C. 154(b) by 710 days.

(21) Appl. No.: 14/283,918

(22) Filed: May 21, 2014

(65) Prior Publication Data
US 2015/0339264 A1 Nov. 26, 2015

(51) Int. Cl.
*G06F 17/14* (2006.01)

(52) U.S. Cl.
CPC .................. *G06F 17/142* (2013.01)

(58) Field of Classification Search
CPC .......................................... G06F 17/14–17/142
USPC .......................................... 708/403–405, 409
See application file for complete search history.

(56) References Cited

U.S. PATENT DOCUMENTS

| 7,483,932 | B1 * | 1/2009 | Boucher | G06F 17/142 708/401 |
| 7,752,249 | B2 * | 7/2010 | Yu | G06F 17/142 365/230.01 |
| 8,266,196 | B2 * | 9/2012 | Cousineau | G06F 17/142 708/404 |
| 2005/0289207 | A1 * | 12/2005 | Lee | G06F 17/142 708/404 |
| 2008/0288569 | A1 | 11/2008 | Gibb et al. | |

OTHER PUBLICATIONS

Y.-W. Lin, H.-Y. Liu, C.-Y. Lee, "A dynamic scaling FFT processor for DVB-T applications", IEEE J. Solid-State Circuits, vol. 39, No. 11, pp. 2005-2013, 2004.*
Ma, Yutai, "An Effective Memory Addressing Scheme for FFT Processors," IEEE Transactions on Signal Processing, vol. 47, No. 3, Mar. 1999, 5 pages.
Pease, Marshall C., "Organization of Large Scale Fourier Processors," Journal of the Association for Computing Machinery, vol. 16, No. 3, Jul. 1969, pp. 474-482.

(Continued)

*Primary Examiner* — Matthew Sandifer

(57) ABSTRACT

A data processing device and a method for performing second or next stage of an N point Fast Fourier Transform is suggested. The processing device comprises an input operand memory unit and an input buffer comprising a plurality of addressable memory cells arranged in lines and columns. Furthermore, the device comprises a number of radix-P operation units for producing output operands that are buffered in an output buffer. Input operands are read from the input operand memory unit and buffering into the input buffer. The input operands are stored and fetched from the input buffer according to a reordering scheme that allows efficient parallel processing of the operands by the butterflies and the buffering of subsequent input operands.

19 Claims, 13 Drawing Sheets

(56) References Cited

OTHER PUBLICATIONS

Chang, C. et al., "A Novel Memory-Based FFT Processor for DMT/OFDM Applications," Proceedings of the 1999 IEEE International Conference on Acoustics, Speech, and Signal Processing; Mar. 15-19, 1999; 4 pages.

Johnson, L.G., "Conflict Free Memory Addressing for Dedicated FFT Hardware," IEEE Transactions on Circuits and Systems13 II: Analog and Digital Signal Processing; vol. 39, No. 5; May 1992, pp. 312-316.

Takala, J. et al., "Conflict-Free Parallel Memory Access Scheme for FFT Processors," IEEE Proceedings of the 2003 International Symposium on Circuits and Systems; May 25-28, 2003; 4 pages.

* cited by examiner

|  |  | RADIX 4 |  |  |  |  |
|---|---|---|---|---|---|---|
| FFT POINTS | SPACING AT STAGE 1 | SPACING AT STAGE 2 | SPACING AT STAGE 3 | SPACING AT STAGE 4 | SPACING AT STAGE 5 | SPACING AT STAGE 6 |
| 16 | — | 4 |  |  |  |  |
| 32 | — | 4 |  |  |  |  |
| 64 | — | 4 | 16 |  |  |  |
| 128 | — | 4 | 16 |  |  |  |
| 256 | — | 4 | 16 | 64 |  |  |
| 512 | — | 4 | 16 | 64 |  |  |
| 1024 | — | 4 | 16 | 64 | 256 |  |
| 2048 | — | 4 | 16 | 64 | 256 |  |
| 4096 | — | 4 | 16 | 64 | 256 | 1024 |

*FIG. 2A*

|  |  | RADIX 4 |  |  |  |  |
|---|---|---|---|---|---|---|
| FFT POINTS | SPACING AT STAGE 1 | SPACING AT STAGE 2 | SPACING AT STAGE 3 | SPACING AT STAGE 4 | SPACING AT STAGE 5 | SPACING AT STAGE 6 |
| 16 | — |  |  |  |  |  |
| 32 | — |  | 16 |  |  |  |
| 64 | — |  |  |  |  |  |
| 128 | — |  |  | 64 |  |  |
| 256 | — |  |  |  |  |  |
| 512 | — |  |  |  | 256 |  |
| 1024 | — |  |  |  |  |  |
| 2048 | — |  |  |  |  | 1024 |
| 4096 | — |  |  |  |  |  |

*FIG. 2B*

| CYCLE | | | | | | | |
|---|---|---|---|---|---|---|---|
| 1 | 0 | 1 | 2 | 3 | 4 | 5 | 6 | 7 |
| 2 | 16 | 17 | 18 | 19 | 20 | 21 | 22 | 23 |

KERNEL 1   KERNEL 2

| CYCLE | | | | | | | | |
|---|---|---|---|---|---|---|---|---|
| 3 | | | 2 | 3 | 4 | 5 | 6 | 7 |
| | | | 18 | 19 | 20 | 21 | 22 | 23 |
| KERNEL 3 | 8 | 9 | 10 | 11 | 12 | 13 | 14 | 15 |
| KERNEL 4 | 24 | 25 | 26 | 27 | 28 | 29 | 30 | 31 |

*FIG. 13*

PROCESSING DEVICE AND METHOD FOR PERFORMING A STAGE OF A FAST FOURIER TRANSFORM

FIELD OF THE INVENTION

This invention relates to a data processing device and to a method for performing a stage of a Fast Fourier Transform.

BACKGROUND OF THE INVENTION

The Discrete Fourier Transform (DFT) is a linear transformation that maps a sequence of N input numbers X1 to XN (input operands) into a corresponding set of N transformed numbers (output operands). A Fast Fourier Transform (FFT) is a processing scheme for carrying out a DFT numerically in an efficient manner. The Cooley-Tukey algorithm is probably the most widely-used FFT algorithm. It transforms the input operands in a sequence of several stages. Each stage is a linear transformation between a set of input operands and a corresponding set of output operands. The output operands of a given stage may be used as the input operands of the next stage, until the final output operands, i.e., the DFT of the initial input operands, are obtained. Each of these linear transformations may be represented by a sparse matrix and therefore can be carried out rapidly. The DFT can thus be represented as a product of sparse matrices.

Each stage of the FFT may involve the evaluation of so-called butterflies. A radix P butterfly is a linear transformation between P input operands and P output operands. In each stage, the N input operands may be partitioned into N/P sets of input operands. Each of these sets may be transformed individually, i.e., not dependent on the other sets of input operands, by means of the radix P butterfly. While the butterfly may be the same for each subset of input operands and for each stage, the partitioning of the set of N input operands into the N/P subsets is generally different for each stage.

FIG. 1 schematically illustrates an example of a second or following stage of an FFT of order N=32, i.e., a FFT on a set of 32 input operands. In the FIG. 1, the output operands of a first stage (not shown) are multiplied by a twiddle factor and then input for the second stage. Please note that FIG. 1 was cut off at operand X23, the other operands X24-X31 are not shown.

The two columns with the heading $W_{32}^n$ in FIG. 1 indicate with what factor the operands are multiplied before they are processed in a following stage. For example, a value of 0 in these columns means a multiplication with a factor $W_{32}^0=1$. As mentioned above, the set of input operands for a particular stage may be partitioned into N/P subsets, and a radix P butterfly may be applied to each of the subsets. In the example of FIG. 1, P equals 4 in the column "Radix 4 stage". In the column "Radix 4 stage" only two butterflies are schematically represented, see butterfly labelled '1' and butterfly labelled '5'.

Each line in FIG. 1 is representing 1 input/output operand. Each operand may be complex valued. The values of the operands are not shown in the FIG. 1. The values of the operands may, of course, differ from one stage of the FFT to the other. The output operands of the RADIX4 stage illustrated in FIG. 1 may be input operands for a following RADIX4 stage or for a final RADIX2 stage of the FFT.

Each input operand may be stored at an addressable memory cell. Similarly, each output operand of the stage may be stored at an addressable memory cell. A memory cell or a buffer cell may also be referred to as a memory location or a buffer location, respectively. Conveniently, the input operands X0-X31 may be stored at input memory cells labelled 0 to 31 in the present example. Similarly, the output operands Y0 to Y31 may be written to output memory cells labelled 0 to 31. In other words, the I-th input operand (I=0 to 31) may be provided at the I-th input memory cell. The I-th output operand (I=0 to 31) would be written to the I-th output memory cell.

The partitioning of the set of input operands into subsets corresponding to butterflies may, in general, be different for different stages of the FFT. The butterflies of a given stage may be executed independently from one another, sequentially, or in parallel. In the example of FIG. 1, N/4=32/4=8 butterflies in the RADIX4 stage(s) will be executed sequentially. Two butterflies may be executed in parallel.

In the RADIX2 stage of FIG. 1 only three butterflies are shown for simplicity. The output operands of the previous stage are multiplied by a twiddle factor $W_{32}^0$ and input for the butterflies at the RADIX2 stage.

In today applications, the input operands may be stored conveniently in a memory unit (e.g. SRAM) in accordance with their numbering. In other words, the input operands 0 to N−1 may be conveniently stored in a memory unit at memory locations with addresses ordered in the same manner as the input operands. For instance, input operand 0 may be stored at address 0. Input operand 1 may be stored at address 1, and so on. However, due to the spacing between the input operands, the input operands may have to be read individually from non-contiguous memory locations before the respective butterfly can be applied on them. The input operands required for a certain butterfly, e.g., the input operands 0, 4, 8, and 12 for the first butterfly in the left part of FIG. 1, can, in this case, not be read as a block from the memory unit. Thus if the operands would be just read and processed in the linear way they are stored in a memory unit, there would be a negative impact on the throughput of an FFT processor.

SUMMARY OF THE INVENTION

The present invention provides a data processing device and method as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 2A shows a table with the spaces listed for a RADIX4 butterfly;

FIG. 2B shows a table with the spaces listed for a RADIX2 butterfly;

FIG. 13 shows an example of the filling of the input buffer according to an embodiment for a RADIX 2 stage of the FFT;

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Figure 1:
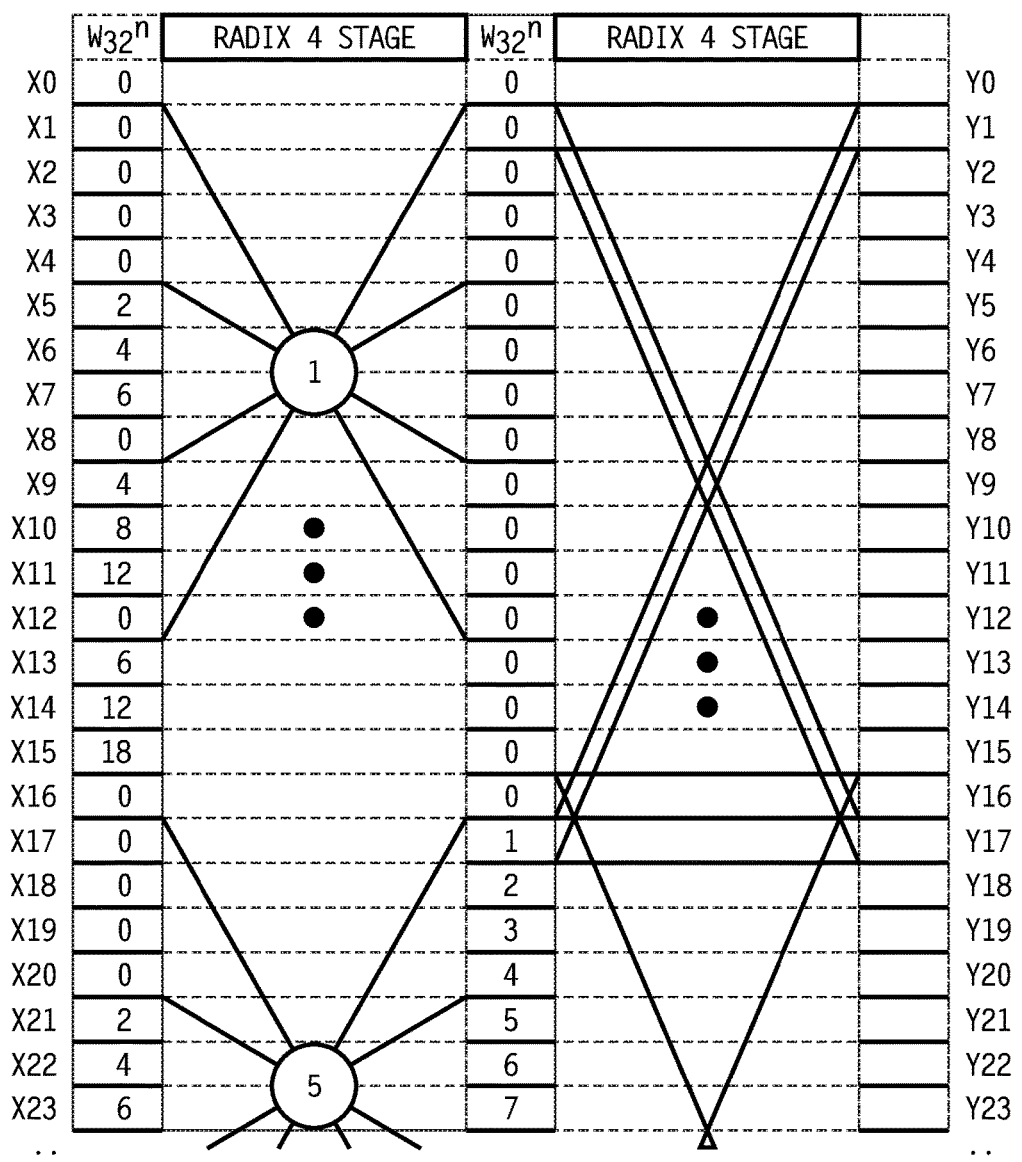
FIG. 1 schematically illustrates an example of a butterfly scheme for a second or following stage of a 32 points FFT.

As mentioned above, the butterflies shown in FIG. 1 are structured such that a spacing between consecutive input operands is present. For example in the second stage, the operands X0, X4, X8, and X12 are input to the RADIX4 butterfly labelled 1. So between input operand X0 and operand X4 a spacing of 4 is present, the same accounts for the spaces between operand X4 and X8, etcetera. The same accounts for the output operands. The spacing between consecutive input/output operands for a butterfly depends on the number of FFT points (i.e. size of the FFT calculation), the RADIX type and the stage number. FIG. 2A shows a table with the spaces listed for a RADIX4 butterfly. As can be seen from the table of FIG. 2A, the spacing increases when the stage number increases. FIG. 2B shows a table with the spaces listed for a RADIX2 butterfly. As will be clear to the skilled person, the RADIX2 is only used as the last stage of a FFT calculation, so at each line in the table of FIG. 2B only one spacing value is present, and only for those FFT sizes where RADIX2 butterflies are needed, see FFT points=32, 128, 512, 2048.

Figure 3:
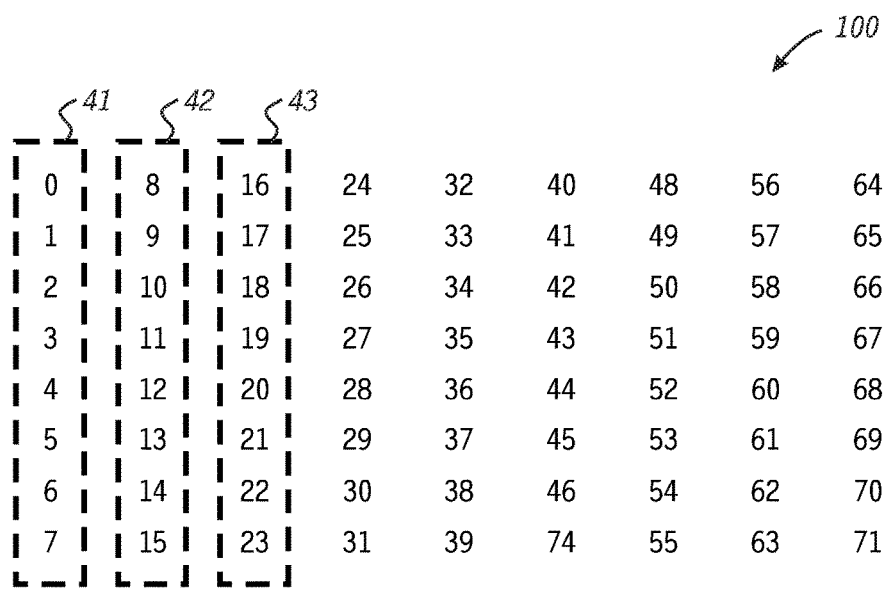
FIG. 3 schematically illustrates an example of a memory unit.

FIG. 3 schematically illustrates an example of an arrangement of input operands labelled 0 to 71 stored in a memory unit 100. The memory unit containing the input operands is referred to as an input operand memory unit. The input operand memory unit 100 may be an internal volatile memory, such as RAM, e.g. SRAM, of an FFT processor. The memory unit 100 is arranged to allow reading the input operands in blocks of K operands, with K being a positive integer, and in this example equal to 8. Each block may contain a sequence of successive operands. In the FIG. 3, these blocks are shown as columns. In the present example, a first block 41 may comprise operands 0 to 7, a second block 42 may comprise operands 8 to 15, and so on. The numbers shown are the indices or labels of the operands, not their values, e.g., the number "0" indicates the input operand number X0. The memory unit 100 may, for instance, be arranged to read one block of 8 input operands in a single clock cycle. It may thus take the memory unit nine clock cycles to read the nine columns shown in FIG. 3.

For example, in one clock cycle, the first column in FIG. 3 may be read. Operands 0 to 7 may thus be made available for further processing by the butterflies. However, the operands 0 to 7 alone are insufficient for feeding any single radix-four butterfly. For example, the butterfly associated with the input operands 0, 4, 8, and 12 (see again FIG. 1) requires these four input operands 0, 4, 8 and 12 at the same time, so operands 8 and 12 are lacking and need to be read during a further clock cycle.

Figure 4:
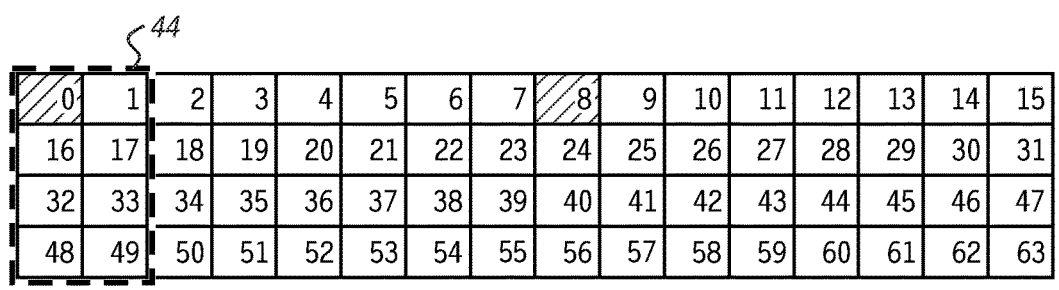
FIG. 4 illustrates an example of a possible partitioning of the set of N input operands for the case of N=64.

FIG. 4 illustrates an example of a possible partitioning of the set of N input operands for the case of N=64. It is recalled that the numbers shown are the indices or labels of the operands, not their values, e.g., the number "0" indicates the input operand number X0. The partitioning of FIG. 4 may be used to arrange input operands required for a third stage of a FFT calculation. In this example, a first pair of radix-four butterflies may process the input operands 0, 16, 32, 48, 1, 17, 33, and 49 (first two columns in FIG. 4), referred to as subset 44. Similarly, a second pair of radix-four butterflies may process the input operands 2, 18, 34, 50, 3, 19, 35 and 51. The remaining columns in FIG. 4 indicate the required values for the subsequent pairs of butterflies to be executed. It is noted that it is not possible to read any of these subsets 44 of input operands (i.e. two columns in FIG. 4) within a single clock cycle from an input operands memory unit as arranged as shown in FIG. 3. For example, the input operands may be readable from the memory unit only in blocks (see blocks 41, 42, 43) of, e.g., eight successive input operands which is the case in an SRAM. In such a case, input operands 0 to 7 may be read from the memory unit in a first read operation. Input operands 16 to 23 may be read in a second read operation. Input operands 32 to 39 may be read in a third read operation, and so on. Each read operation will be performed within a single clock cycle, and only after all required input operands are read, the two butterflies can be fired.

To improve the processing speed of operands, a data processing device comprising an input buffer is proposed using a special buffer addressing scheme. In the following Figures, the addressing scheme is explained.

Figure 5:
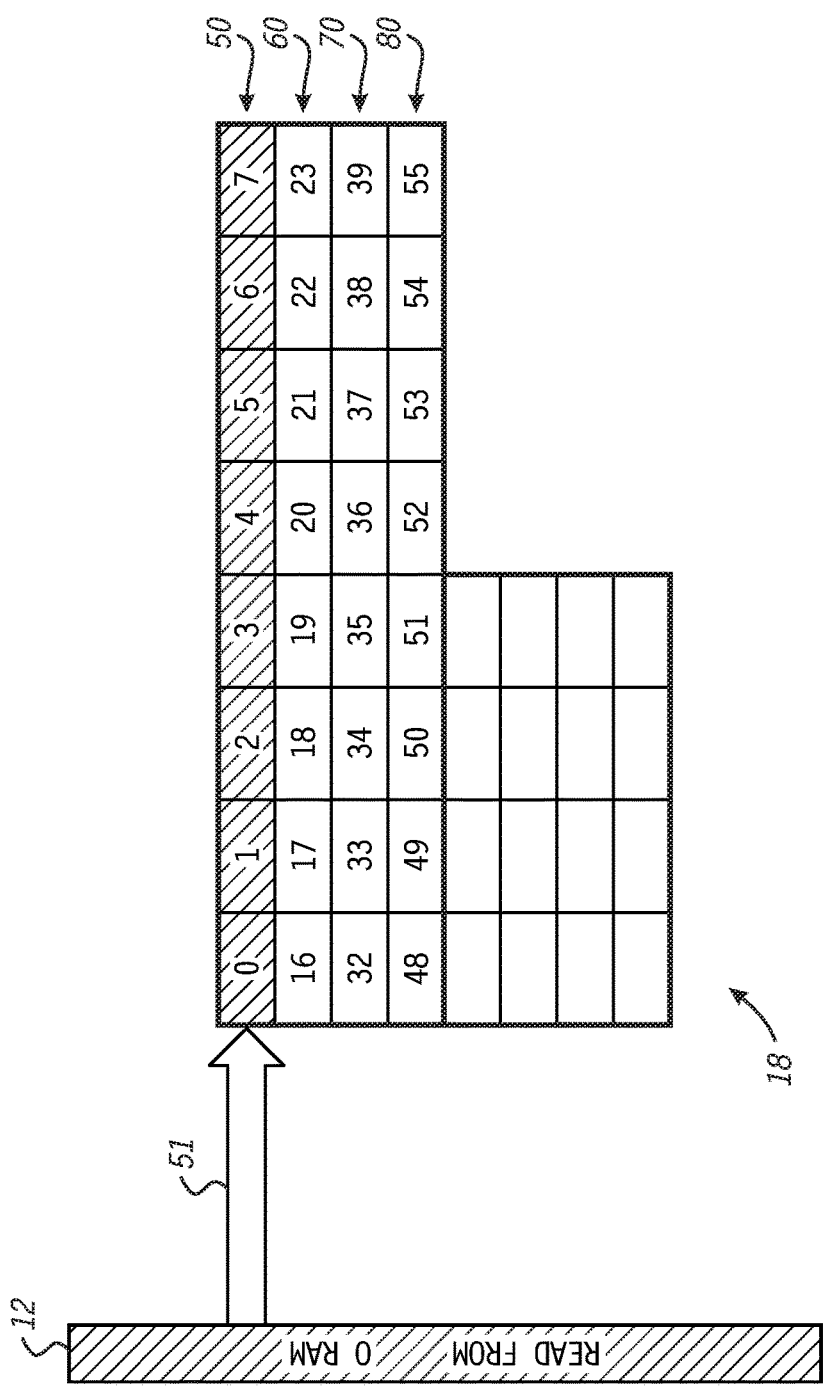
FIG. 5 schematically shows an input operands memory unit and an input buffer of the processing device according to an embodiment during a first clock cycle.

FIG. 5 schematically shows part of the data processing device for performing stage of an N point Fast Fourier Transform according to an embodiment. Each stage comprises computing N output operands on the basis of N input operands by applying a set of N/P radix-P butterflies to the N input operands, with N being a positive integer and P being a value equal to 2 or 4. The data processing device comprises an input operand memory unit 12 and an input buffer 18 comprising a plurality of addressable memory cells arranged in lines (i.e. rows) and columns. The input operand memory unit 12 is arranged to store a plurality of input operands addressable in blocks of K operands, with K being a positive integer. In the following example K=8, but it is noted that other values are possible.

Figure 6:
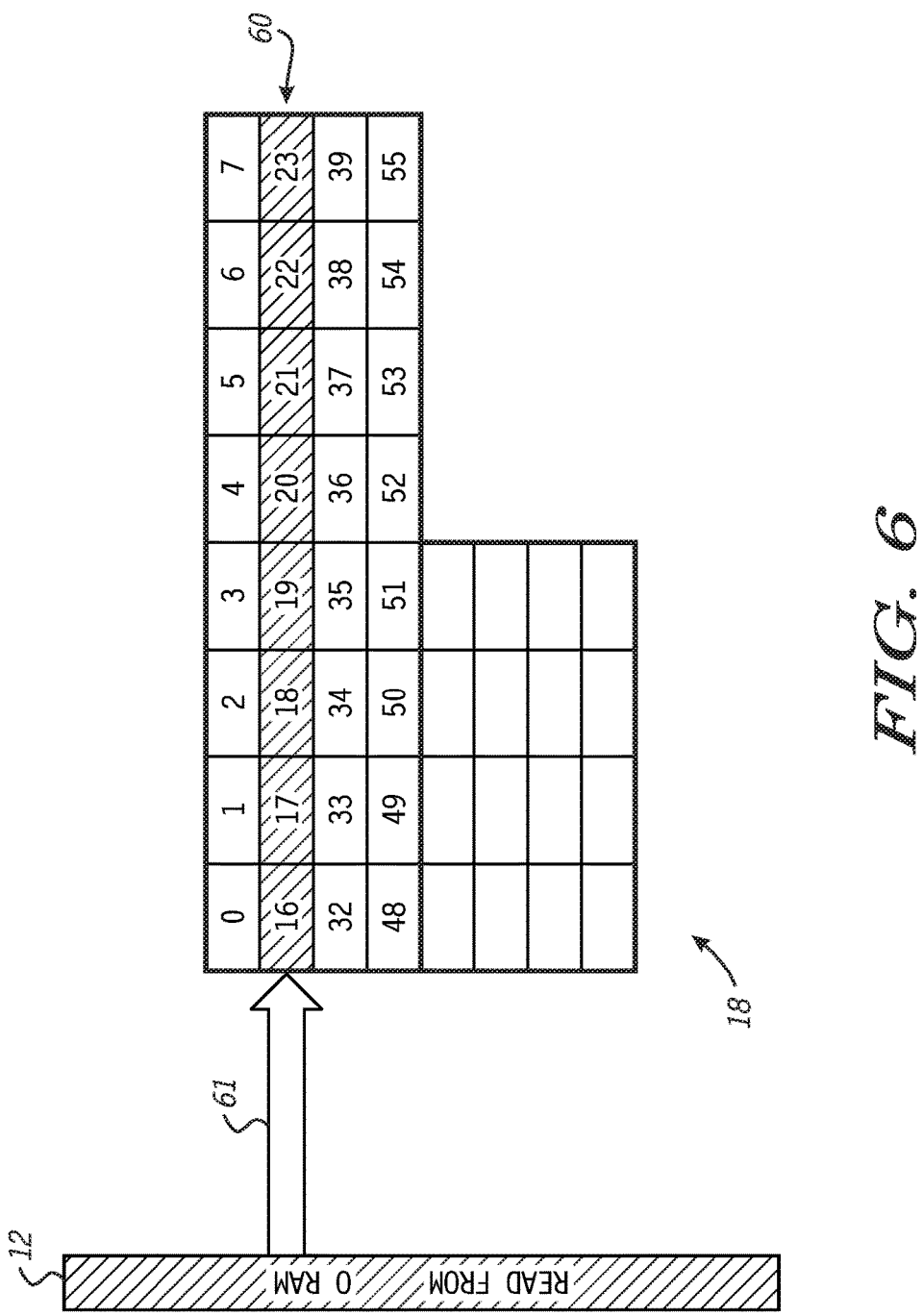
FIG. 6 schematically shows the input operands memory unit and the input buffer of the processing device according to an embodiment during a following clock cycle.

In a first clock cycle, a block of 8 input operands is read from the input operand memory unit 12 and buffered into a first line 50 of the input buffer 18, see arrow 51. FIG. 6 shows a next action in which a further block of 8 input operands is read from the input operand memory unit 12 and buffered into a subsequent line 60 of the input buffer 18.

Figure 7:
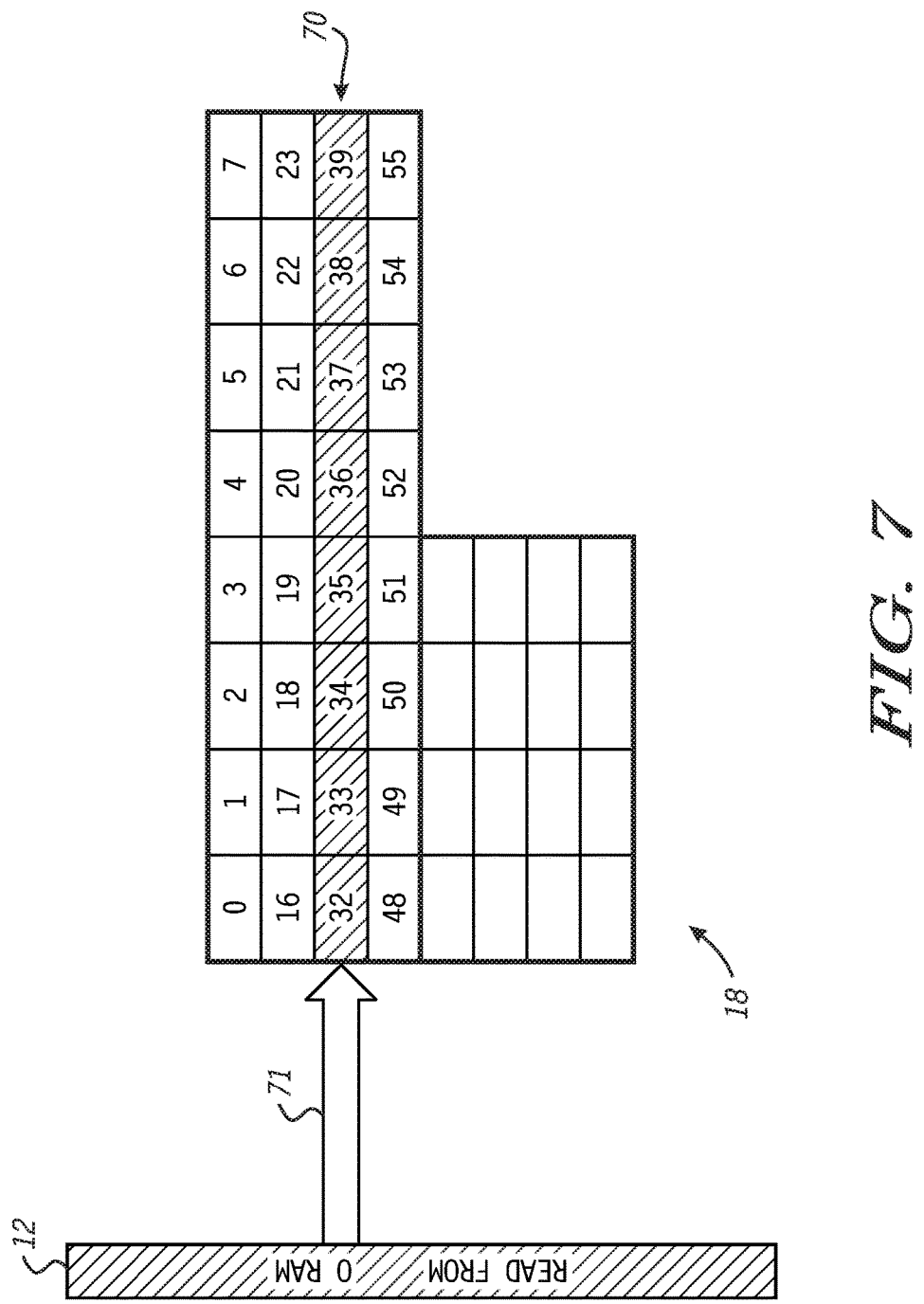
FIG. 7 schematically shows the input operands memory unit and the input buffer of the processing device according to an embodiment during a following clock cycle.

The reading of a further block of 8 input operands from the input operand memory unit 12 and the buffering into a subsequent line of the input buffer 18 is repeated until P lines of the input buffer are filled. Since in this example P=4, two more lines need to be buffered. FIG. 7 shows the buffering of a third block of 8 input operands into a subsequent line 70 of the input buffer 18.

Figure 8:
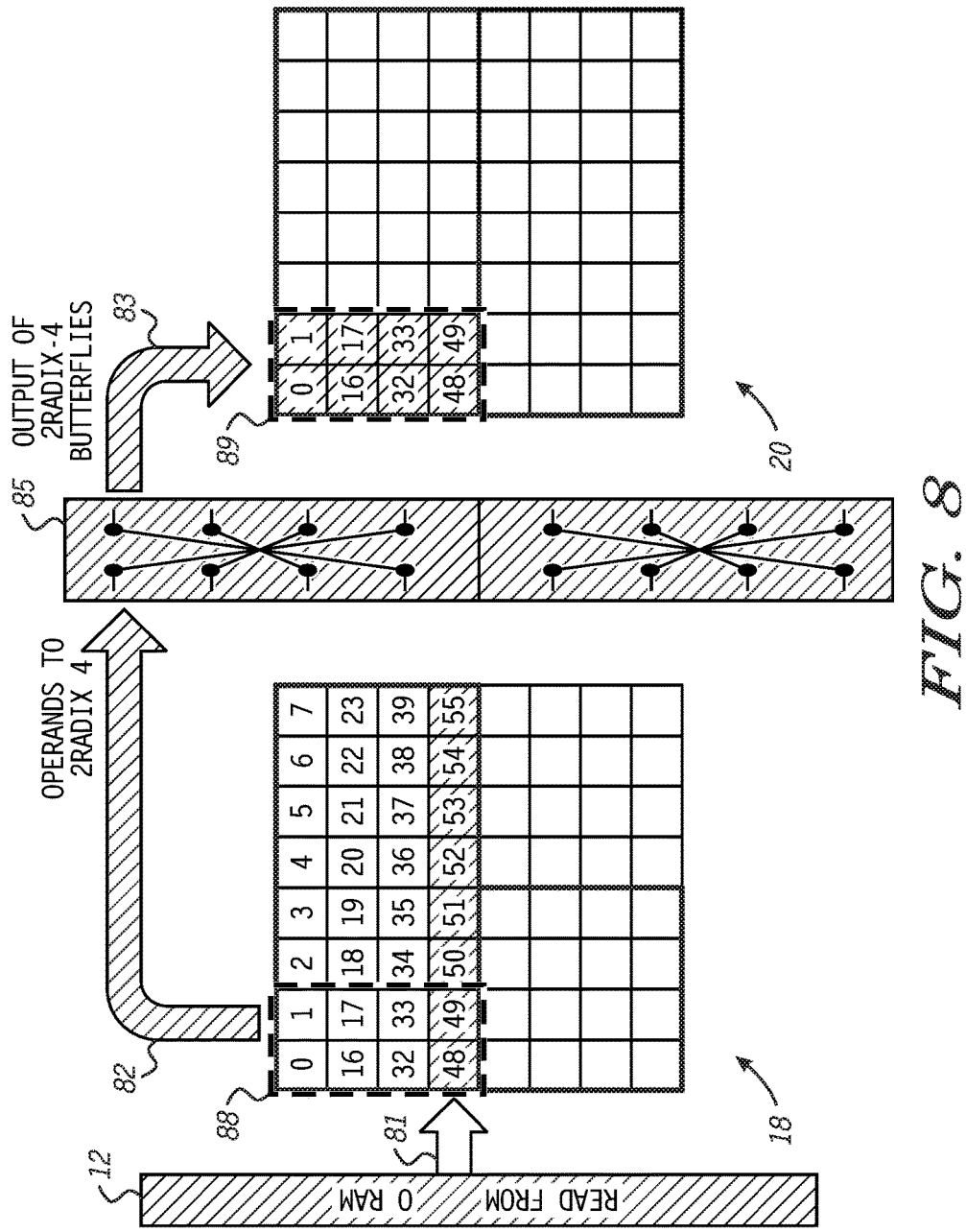
FIG. 8 schematically shows the input operands memory unit, the input buffer, the two butterflies and the output buffer of the processing device according to an embodiment during a following clock cycle.

FIG. 8 shows the buffering of a fourth block of 8 input operands into a fourth line 80 of the input buffer 18. FIG. 8 also shows a pair of radix-P operation units 85 which are arranged to process the input operands buffered in the input buffer 18 and to produce output operands. The output operands are buffered in an output buffer 20. Once P lines of the input buffer 18 are filled, P input operands are transferred from each of 8/P subsequent columns of the input buffer 18 to inputs of the radix-P operation units 85. In this way K=8 operands (referred to as 'column oriented' input operands) are transferred to the radix-P obtain 8 for processing. In this case P=4, so if 4 lines of the buffer 18 are filled, 4 input operands are read from each of 8/4=2 subsequent columns of the input buffer 18, to obtain 8 column oriented input operands. In FIG. 8 a dashed box 88 is used to indicate the 8 memory cells that are read. It is noted that the column oriented input operands do not need to be addressed per column. The name column oriented is used as to differentiate from 'line oriented' which will be discussed later on. The input buffer 18 may be randomly accessible and that the column oriented operands may be processed as one block of operands, also referred to as 'kernel'.

The 8 column oriented input operands are transferred to the 2 radix-4 butterflies, see arrow 82. This may be performed in the clock cycle during which the $P^{th}$ line of the input buffer 18 was filled, see arrow 81.

A processing period of the radix-P operation units 85 may be for example 4 or 5 clock cycles. The outcome of the butterflies is also referred to as butterfly processed operands. In FIG. 8, an arrow 83 indicates that, after the butterfly processing period, 8 butterfly processed operands are buffered (i.e. stored) in the output buffer 20. In an embodiment, the addressing scheme for buffering the butterfly processed operands into the output buffer 20 is identical to the scheme used to read the input operands from the input buffer 18. So in FIG. 8 the first memory cells that are filled are indicated with a dashed box 89.

The reading of 4 input operands from each of the 2 subsequent columns of the input buffer 18 and the processing of the column oriented input operand in the 2 radix-4 butterflies is repeated during subsequent clock cycles until 8 of the columns of the input buffer 18 are read and processed. This is shown in FIGS. 9, 10 and 11.

Figure 9:
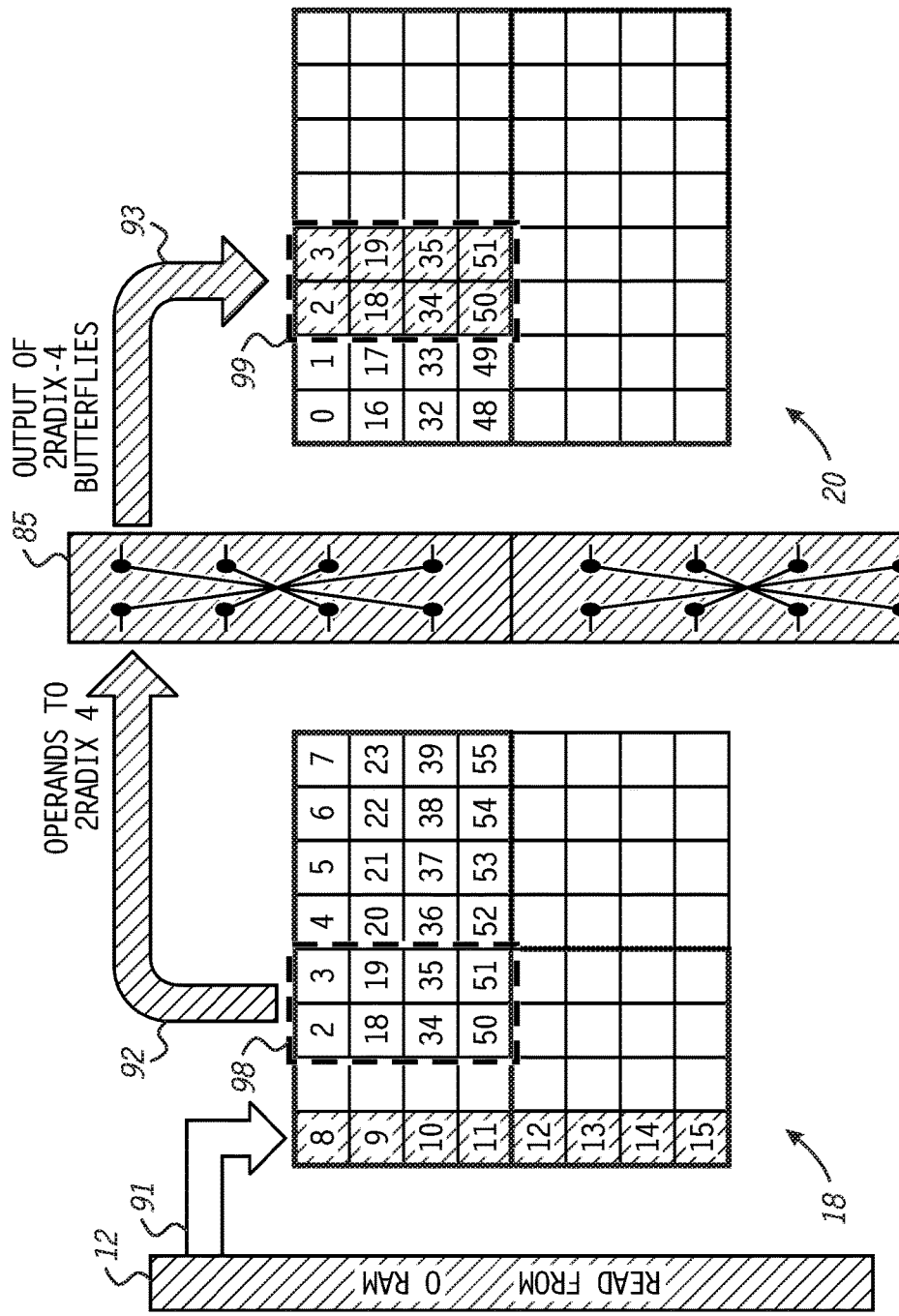
FIGS. 9, 10, 11 and 12 schematically show the embodiment of FIG. 8 in subsequent clock cycles.

FIG. 9 shows the situation one clock cycle after the situation of FIG. 8. In FIG. 9 an arrow 91 indicates the reading of a $(P+1)^{th}$ block of 8 input operands from the input operand memory unit 12 and buffering the block into a first column of the input buffer 18. An arrow 92 indicates the transferring of 8 buffered input operands to the radix-P operation units 85. In more general terms, the transferring indicated by arrow 92 relates to the transfer of K input operands from K/P columns of the input buffer 18 subsequent to the first K/P columns, to the radix-P operation units 85.

During the previous clock cycle (see FIG. 8) the buffered input operands (kernel 88) were read from the first (and second) column of the input buffer 18, see arrow 82 in FIG. 8. In this next clock, the further block of 8 input operands is read from the input operand memory unit 12 and can be buffered into the first column of the input buffer 18, see arrow 91. The memory cells in the first two columns can be reused again once the previous operands are sent to the radix-P operation units 85. So by changing the filling direction from lines to columns, the whole process is made faster and less clock cycles are needed, while only needing a 'gun shaped' memory buffer of 48 cells.

Figure 10:
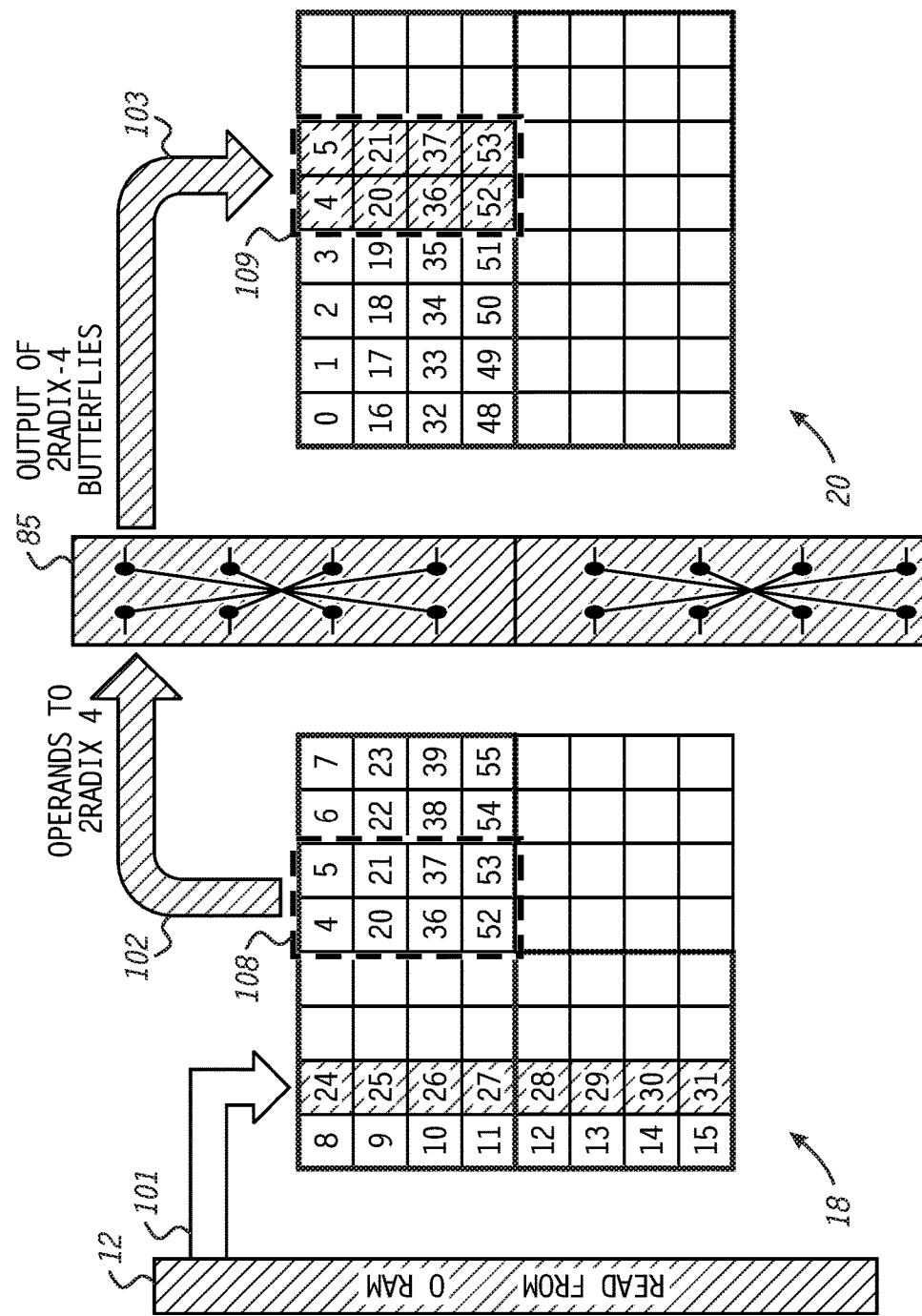
Figure 11:
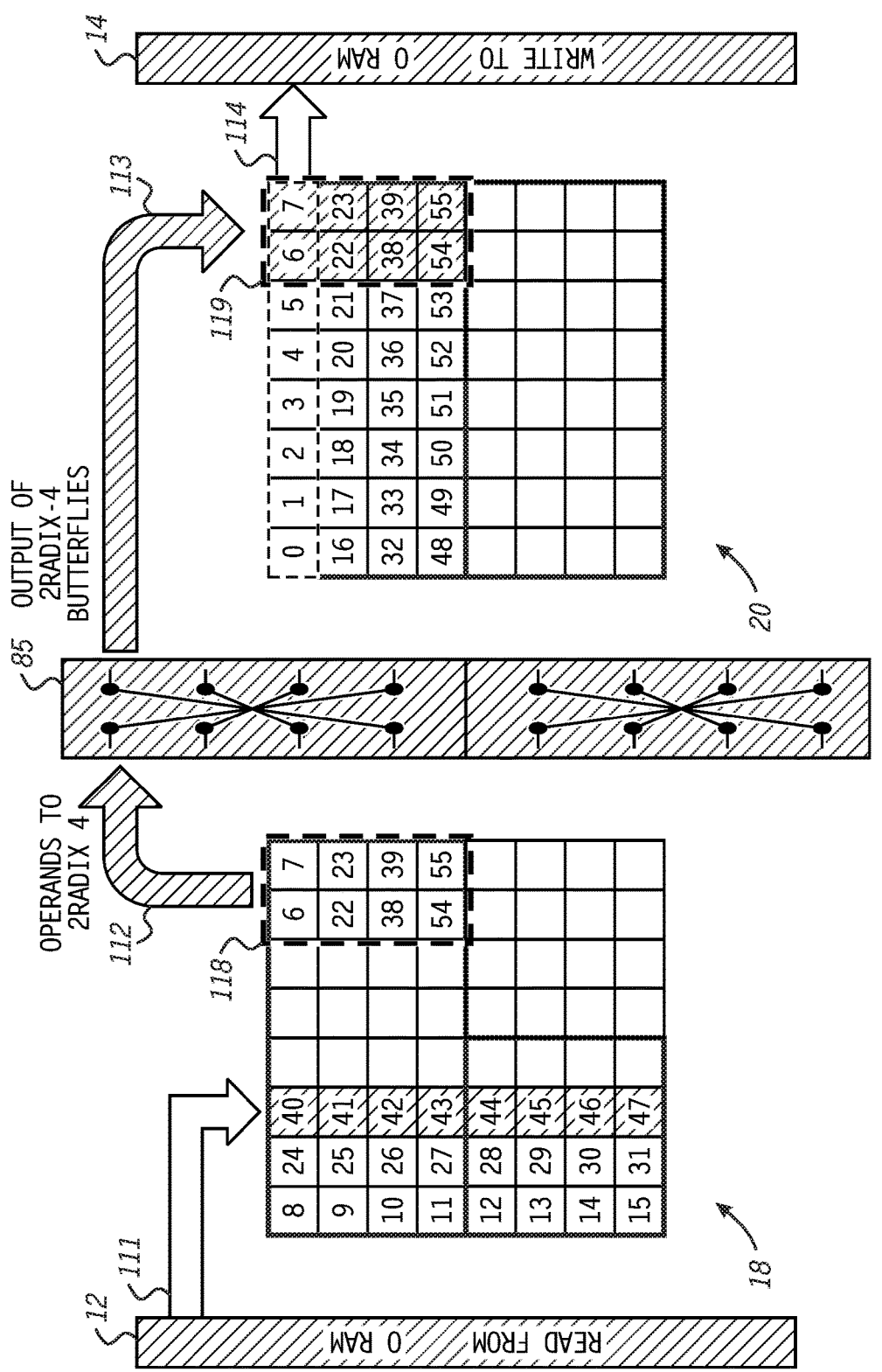

FIG. 10 shows the situation one clock cycle after the situation of FIG. 9. In FIG. 10 an arrow 101 indicates the reading of a further block of 8 input operands from the input operand memory unit 12 and buffering the further block into a subsequent column (the second column) of the input buffer 18. The reading of a further is repeated until P=4 columns of the input buffer are filled; see arrow 111 in FIG. 11, and arrow 121 in FIG. 12.

During the clock cycle, in which the third column of the input buffer 18 is filled, see arrow 111 in FIG. 11, a fourth block 118 may be input to the radix-P operation units 85, see arrow 112. After the butterfly processing period a fourth block 119 of butterfly processed operands is buffered in the output buffer 20. At the same clock cycle in which block 119 was buffered a first line of the output buffer 20 is written to the output operand memory unit 14, see arrow 114. By performing the specific reading and buffering actions in the same clock cycle, the FFT calculation is speed up considerably by using a minimal buffer size.

Figure 12:
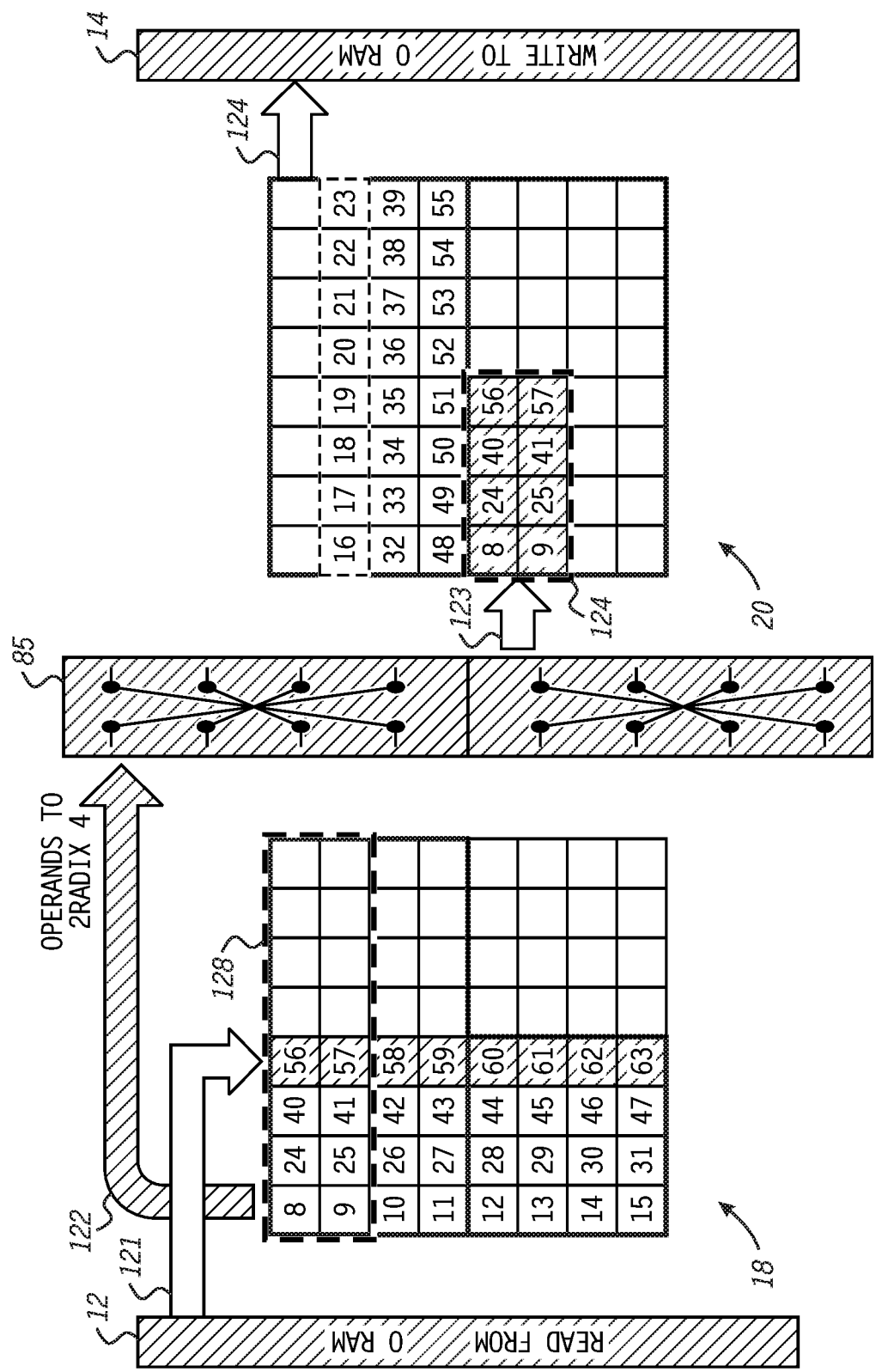

In FIG. 12 an arrow 122 indicates that during the same clock cycle in which the block of 8 input operands from the input operand memory unit 12 is read and buffered into the fourth column of the input buffer 18, see arrow 121, 4 (i.e. P=4) input operands from each of 2 (i.e. 8/P) subsequent lines of the input buffer 18 are read, see arrow 122, to obtain 8 so-called 'line oriented' (as opposed to 'column oriented') input operands indicated by a dashed box 128. The 8 line oriented input operands are then processed by the two radix-4 operation units 85 for producing 8 further butterfly processed operands. The 8 further butterfly processed operands are buffered in a kernel 129 which is a memory region located at the fifth and sixth line and at the column number 1-4.

The "line oriented addressing" and further processing is repeated until 8 of the lines of the input buffer 18 are read and processed. The operands produced by the radix-P operation units 85 when processing memory region (kernel) 128 are buffered in a memory region 129 of the output buffer 20. At the same clock cycle, a second line of the output buffer 20 is written to the output operand memory unit 14, see arrow 124 in FIG. 12.

During a clock cycle after the one shown in FIG. 12, a kernel of 2 lines and 4 columns wide, located underneath the region 128 is processed by the butterflies and buffered in output buffer 20 at a location underneath region 129 after a butterfly processing period. In yet a further clock cycle, a kernel of 2 lines and 4 columns wide, located at the seventh and eighth line underneath the region 128 is processed by the butterflies. After a butterfly processing period, the butterfly processed operands are buffered in the output buffer 20 at a region above region 129 located at lines 1 and 2 and columns 1-4.

The input buffer 18 and output buffer 20 described above each comprises only 8×8−4×4=48 cells. It saves gate count/area taken by the device.

In an embodiment a similar reordering of the operands in the input buffer 18 and the output buffer 20 is performed for the execution of a RADIX 2 stage. FIG. 13 shows an example of the filling of the input buffer 18. At the upper part of FIG. 13 only the first two lines of the input buffer 18 are shown, while at the lower part of the FIG. 13, all active cells of the input buffer 18 are shown. During a cycle 1 a first line of the input buffer is filled. During a subsequent cycle 2 a second line of the input buffer is filled and a kernel 1 is processed by two RADIX 2 butterflies. This process is similar to the one described in FIG. 8 with the RADIX 4 butterflies. During a subsequent cycle 3 a first column of the input buffer is filled and a kernel 2 is processed by the four RADIX 2 butterflies. During a subsequent cycle 4 a second column of the input buffer is filled and a kernel 3 is processed by the four RADIX 2 butterflies. In a following clock cycle, the kernel 4 is processed while the line 1 of the input buffer is filled again.

Note that the input buffer 18 comprises 48 cells which are all used for the RADIX 4 stages, but only 24 of them are used in the RADIX 2 stage processing. Only the addressing scheme needs to be controlled depending on the RADIX number.

Figure 14:
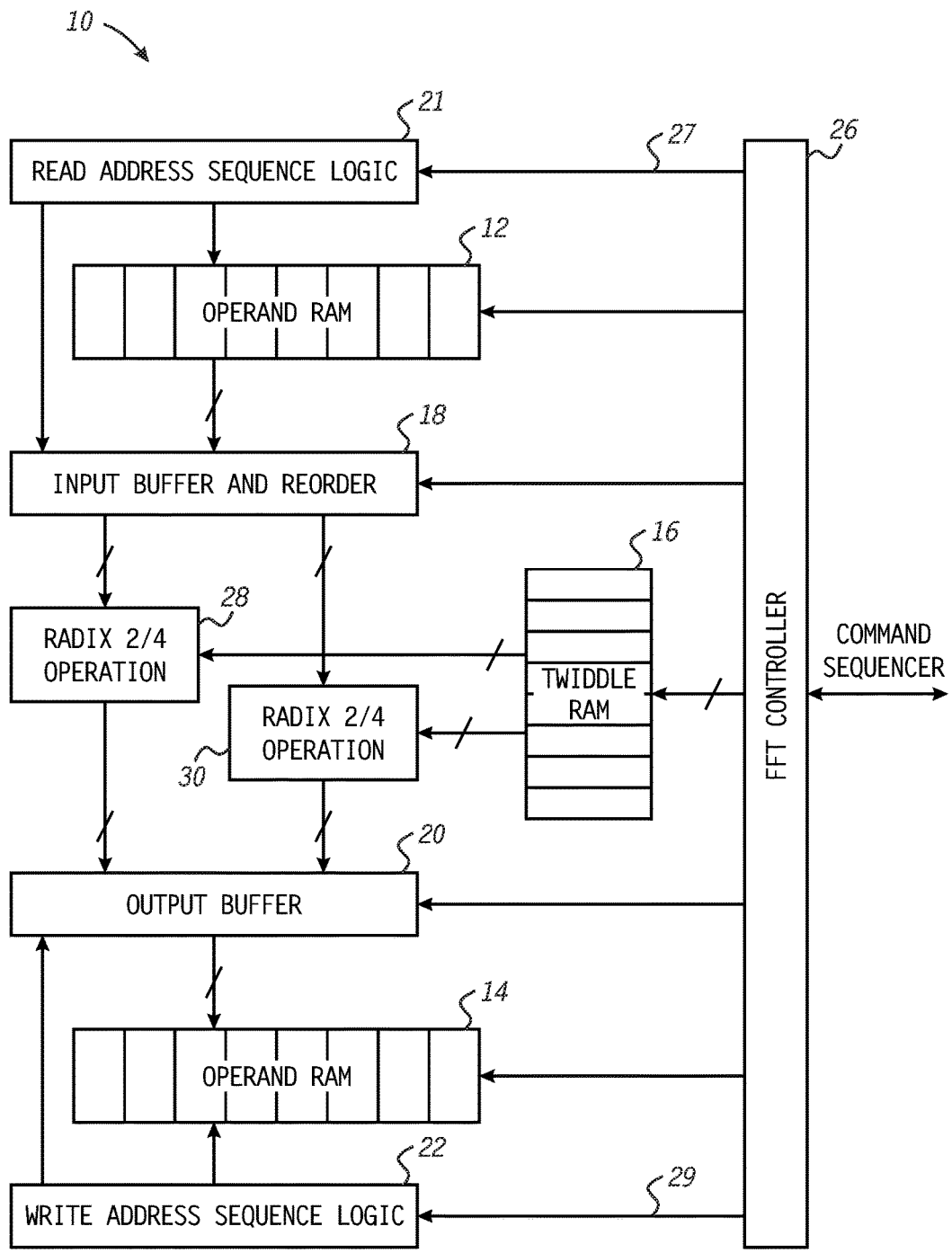
FIG. 14 schematically shows an example of an embodiment of the data processing device for performing a stage of a Fast Fourier Transform.

FIG. 14 schematically shows an example of an embodiment of a processing device 10 for performing a stage of a Fast Fourier Transform (FFT). Each stage may comprise the computing of N output operands on the basis of N input operands by applying a set of N/P radix-P butterflies to the N input operands, with N being a positive integer and P being a value equal to 2 or 4. The data processing device 10 comprises an input operand memory unit 12 arranged to store a plurality of input operands, and an input buffer 18 comprising a plurality of addressable memory cells arranged in lines and columns. FIG. 14 also shows 2 radix-4 operation units 28, 30, each being connected to the input buffer 18 to receive input operands buffered in the input buffer 18. In this case K=8 and P=4, but these parameters may have other values as well.

A logic circuit 21, such as a read address sequence logic 21, may be arranged to control the input operand memory unit 12 and the input buffer 18, so as to:
  read P subsequent blocks of K input operands from the input operand memory unit 12;
  buffer the P subsequent blocks into P subsequent lines of the input buffer 18;
  transfer K column oriented input operands from K/P subsequent columns of the input buffer 18 to the radix-P operation units 28, 30 for processing by the radix-P operation units;
  repeat transferring of the K column oriented input operands from the K/P subsequent columns of the input buffer 18 to the radix-P operation units 28, 30 for processing until K of the columns of the input buffer 18 are transferred and processed;
  read P further subsequent blocks of K input operands from the input operand memory unit 12;
  buffer the P further subsequent blocks into P subsequent columns of the input buffer 18;
  transfer K line oriented input operands 88 from K/P subsequent lines of the input buffer 18 to the radix-P operation units for processing by the radix-P operation units;
  repeat transferring of the K line oriented input operands from the K/P subsequent lines of the input buffer 18 to the radix-P operation units 28, 30 for processing until K of the lines of the input buffer 18 are transferred and processed.

The device 10 comprises a clock (not shown) arranged to send a clock signal to the modules of the device 10, such as the logic circuit 21 and the radix-P operation units 28, 30. As was discussed above, the action of inputting the K column oriented input operands stored in a first column of the input buffer (18) to a respective radix-P operation unit, and the action of the reading of a further block of K input operands from the input operand memory unit (12) and buffer the further block into the first column of the input buffer 18, may be performed in a single clock cycle to optimize the processing of the operands.

Furthermore, the logic circuit 21 may be arranged so that the action of the reading of a further block of K input operands from the input operand memory unit 12 and buffer the further block into a $P^{th}$ line of the input buffer 18 and the action of the inputting of the P input operands from the first K/P columns of the input buffer 18 to a respective radix-P operation unit, are performed in a single clock cycle.

In an embodiment, logic circuit 21 may be arranged so that the action of the buffering of the further block of K input operands into a $P^{th}$ column of the input buffer 18, and the action of the inputting of the P input operands from the K/P lines of the input buffer 18, are performed in a single clock cycle.

The device as described above may comprise an input buffer, see input buffer 18, which comprises a set of $K^2-(K-4)^2$ individually addressable buffer cells, each cell being capable of buffering one input operand. The parameter K may be a multiple of 4 for example K=8.

In the specific example of FIG. 14, the device 10 comprises an input operand memory unit 12, an output operand memory unit 14, a coefficient memory unit 16, an input buffer 18, an output buffer 20, a read address sequence unit 21, a write address sequence unit 22, and a control unit 26, also referred to as FFT controller 26. The FFT controller 26 may be arranged to initiate one or more of the modules such as the read address sequence logic 21, the write address sequence logic 22, and the input buffer 18 and the output buffer 20. The FFT controller 26 may set parameters (such as the FFT length, the stage number and the value for P) to initiate the read address sequence logic 21 and the write address sequence logic 22, see arrows 27, 29.

The device 10 may be arranged to operate, for example, as follows. A set of N operands may be loaded, e.g., to the operand memory unit 12 from, e.g., a data acquisition unit (not shown), which may be suitably connected to the input operand memory unit 12. The input operand memory unit 12, e.g., may be a random access memory unit (RAM), e.g., a static RAM (SRAM). The operands in the memory unit 12 are not necessarily addressable individually. Instead, only groups of input operands may be addressable individually. Each group may consist of 8 operands. A single address may be assigned to a group of 8 operands. For example, operands 0 to 7 may then form a first addressable group of operands, see also block 41 in FIG. 3. Operands 8 to 15 may form a second addressable ground of operands, and so on. The read address sequence unit 24 may be arranged to generate the respective addresses of the operands that are to be retrieved from the input operand memory unit 12. The respective groups of operands may thus be read from the input operand memory unit 12 and stored in the input buffer 18. The operands may be reordered as described with reference to FIG. 5-13.

Each group of 8 input operands, e.g., stored under a single address in the input address memory unit 12, may form a single line of the input buffer 18 described above. Each line of each input buffer 18 may thus be available as an addressable group of input operands in the input operand memory unit 12. When sufficient input operands have been buffered in the input buffer 18, they may be transformed into corresponding output operands by the radix P butterflies. The butterflies may be processed in parallel. For instance, in the shown example, there are two radix 4 operation units 28 and 30. The radix P operation units 28 and 30 may be identical. The first radix P operation unit 28 may be arranged to calculate a first radix P butterfly on a first subset of operands in a current column of the input operand matrix available in the input buffer 18. The second radix P operation unit 30 may, at the same time, calculate the same radix P butterfly on a second subset of input operands on a subsequent column of the input operand matrix available in the input buffer 18. In a variant of the shown device 10, the radix P operation units 28 and 30 may be substituted by a single radix P operation unit or by more than two radix P operation units.

Above a particular addressing scheme is discussed for reading and buffering the input operands before they are transformed into the corresponding output operands in accordance with the shown butterflies. The described embodiments allows e.g. K=8 operands read and 2 Radix 4 butterflies execution in every clock cycle without any pause to fetch further data. It is noted that the invention is not limited to the parallel processing of K=8 operands. Instead of 8 operands 4, 12, 16, 20 or any other multiple of 4 could be used. For example, if K=12, three operation units could be used to process three butterflies in parallel for three Radix-4 calculations. The number of memory cells needed in the input and/or output buffer would be $K^2-(K-4)^2$. In the example of FIG. 5-12, the number of cells used and needed is $8^2-(8-4)^2 = 48$ as was mentioned above.

The further logic circuit 22 (e.g. the write address sequence logic 22) is arranged to control the output operand memory unit 14 and the output buffer 18 so as to buffer operands processed by the radix-P operation units 28, 30, into the output buffer 20, and to write the processed operands from the output buffer 20 into the output operand memory unit 14. The further logic circuit 22 may be arranged to address the output buffer 20 according to the addressing scheme used by the logic circuit 21 for addressing the input buffer 18, see also the FIGS. 8-12 which show the filling and reading of the output buffer 20.

The invention also relates to a method for performing a stage of an N point Fast Fourier Transform, wherein each stage comprises computing N output operands on the basis of N input operands by applying a set of N/P radix-P butterflies to the N input operands. N may be a positive integer, such as 32, 64, 128, 256, 512, 1024, 2048. P may be an integer with a value equal to 2 or 4. In an embodiment the method comprises:

reading P subsequent blocks of K input operands from an input operand memory unit, with K being a positive integer;

buffering (see arrows 51,61,71,81 of FIGS. 5-8) the P subsequent blocks into P subsequent lines of an input buffer having a plurality of addressable memory cells arranged in lines and columns;

transferring (see arrow 82 of FIG. 8) K column oriented input operands (88) from K/P subsequent columns of the input buffer to the radix-P operation units 85;

processing the K column oriented input operands in radix-P operation units;

repeating the transferring (see arrows 92, 102, 112 of FIGS. 9-11) of K column oriented input operands from the K/P subsequent columns of the input buffer and the processing of the K column oriented input operands in the radix-P operation units until K of the columns of the input buffer are transferred and processed;

reading P further subsequent blocks of K input operands from the input operand memory unit 12, see Figure;

buffering (see 91,101,111,121 of FIGS. 9-12) the P further subsequent blocks into P subsequent columns of the input buffer 18;

transferring (see arrow 122 of FIG. 12) K line oriented input operands from K/P subsequent lines of the input buffer 18 to the radix-P operation units;

processing the K line oriented input operands (see arrow 128 of FIG. 12) in the radix-P operation units;

repeating the transferring of K line oriented input operands from the K/P subsequent lines of the input buffer and processing the K line oriented input operands until K of the lines of the input buffer are addressed and processed.

In the foregoing specification, the invention has been described with reference to specific examples of embodiments of the invention. It will, however, be evident that various modifications and changes may be made therein without departing from the broader scope of the invention as set forth in the appended claims. The data processing device may for example be implemented as a microprocessor, such as a general purpose microprocessor, a microcontroller, a digital signal processor or other suitable type of microprocessor. The microprocessor may for example comprise one, two or more central processing units (CPU) or cores. Additionally, the microprocessor may comprise one or more peripherals, such as hardware accelerators, co-processors or otherwise, and/or memory, such as on-chip flash or RAM.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit (IC) or within a same device. For example, device 10 may be a single IC. Alternatively, the examples may be implemented as any number of separate integrated circuits or separate devices interconnected with each other in a suitable manner. For example, the units 12, 14, 16, 18, 20, 21, 22, 26, 28, and 30 may be dispersed across more than one IC.

In the claims, any reference signs placed between parentheses shall not be construed as limiting the claim. The word 'comprising' does not exclude the presence of other elements or actions then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A data processing device for performing a stage of an N point Fast Fourier Transform, the stage comprising computing N output operands on the basis of N input operands by applying a set of N/P radix-P butterflies to the N input operands, with N being a positive integer and P being a value equal to 2 or 4, wherein the data processing device comprises:
   an input operand memory unit arranged to store a plurality of input operands addressable in blocks of K operands, with K being a positive integer;
   an input buffer comprising a plurality of addressable memory cells arranged in lines and columns;
   K/P radix-P operation units for calculating the N/P radix-P butterflies, each operation unit being connected to the input buffer;
   a logic circuit arranged to control the input operand memory unit and the input buffer according to an addressing scheme so as to perform the following actions:
      read P subsequent blocks of K input operands from the input operand memory unit;
      buffer the P subsequent blocks into P subsequent lines of the input buffer;
      transfer K column oriented input operands from K/P subsequent columns of the input buffer to the radix-P operation units for processing by the radix-P operation units;
      repeat transferring of the K column oriented input operands from the K/P subsequent columns of the input buffer to the radix-P operation units for processing until K of the columns of the input buffer are transferred and processed;
      read P further subsequent blocks of K input operands from the input operand memory unit;
      buffer the P further subsequent blocks into P subsequent columns of the input buffer;
      transfer K line oriented input operands from K/P subsequent lines of the input buffer to the radix-P operation units for processing by the radix-P operation units; and
      repeat transferring of the K line oriented input operands from the K/P subsequent lines of the input buffer to the radix-P operation units for processing until K of the lines of the input buffer are transferred and processed;
   wherein at least two actions are performed in parallel.

2. The device according to claim 1, wherein the logic circuit is arranged to perform the following two actions in a single clock cycle:
   read a $P^{th}$ block of K input operands from the input operand memory unit and buffer the $P^{th}$ block into a $P^{th}$ line of the input buffer and
   transfer K input operands from the first K/P columns of the input buffer to the radix-P operation units.

3. The device according to claim 1 wherein the logic circuit is arranged to perform the following two actions in a single clock cycle:
   transfer K input operands from K/P columns of the input buffer subsequent to the first K/P columns, to the radix-P operation units, and
   read a $(P+1)^{th}$ block of K input operands from the input operand memory unit and buffer the $(P+)^{th}$ block into a first column of the input buffer.

4. The device according to claim 1, wherein the logic circuit is arranged to perform the following two actions in a single clock cycle:
   read a $(2\times P)^{th}$ block of K input operands from the input operand memory unit and buffer the $(2\times P)^{th}$ block of K input operands into a $P^{th}$ column of the input buffer;
   transfer K input operands from the first K/P lines of the input buffer.

5. The device according to claim 1, wherein the device comprises:
   an output operand memory unit arranged to store a plurality of output operands;
   an output buffer comprising a plurality of addressable memory cells arranged in lines and columns;
   a further logic circuit arranged to control the output operand memory unit and the output buffer so as to:
      buffer operands processed by the radix-P operation units, into the output buffer;
      write the processed operands from the output buffer into the output operand memory unit.

6. The device according to claim 5, wherein the further logic circuit is arranged to address the output buffer according to the addressing scheme used by the logic circuit for addressing the input buffer.

7. The device according to claim 1, wherein the input operand memory unit is a random-access memory unit.

8. The device according to claim 1, wherein the input buffer comprises a set of $K^2$-$(K-4)^2$ individually addressable buffer cells, each cell being capable of buffering one input operand.

9. The device according to claim 1, wherein K is a multiple of 4.

10. The device according to claim 1, wherein K is 8.

11. A method for performing a stage of an N point Fast Fourier Transform, wherein each stage comprises computing N output operands on the basis of N input operands by applying a set of N/P radix-P butterflies to the N input operands, with N being a positive integer and P being a value equal to 2 or 4, wherein a logic circuit is arranged to control an input operand memory unit and an input buffer to perform the method comprising:
   reading P subsequent blocks of K input operands from the input operand memory unit, with K being a positive integer;
   buffering the P subsequent blocks into P subsequent lines of the input buffer having a plurality of addressable memory cells arranged in lines and columns;
   transferring K column oriented input operands from K/P subsequent columns of the input buffer to K/P radix-P operation units for calculating the N/P radix-P butterflies;
   processing the K column oriented input operands in radix-P operation units;
   repeating the transferring of K column oriented input operands from the K/P subsequent columns of the input buffer and the processing of the K column oriented input operands in the radix-P operation units until K of the columns of the input buffer are transferred and processed;
   reading P further subsequent blocks of K input operands from the input operand memory unit;
   buffering the P further subsequent blocks into P subsequent columns of the input buffer;

transferring K line oriented input operands from K/P subsequent lines of the input buffer to the radix-P operation units;

processing the K line oriented input operands in the radix-P operation units; and repeating the transferring of K line oriented input operands from the K/P subsequent lines of the input buffer and processing the K line oriented input operands until K of the lines of the input buffer are addressed and processed;

wherein at least two actions are performed in parallel.

12. The method according to claim 11, wherein the following two actions are performed in a single clock cycle:

reading a $P^{th}$ block of K input operands from the input operand memory unit and buffering the $P^{th}$ block into a $P^{th}$ line of the input buffer and transferring K input operands from the first K/P columns of the input buffer to the radix-P operation units.

13. The method according to claim 11, wherein the following two actions are performed in a single clock cycle:

transferring K input operands from K/P columns of the input buffer subsequent to the first K/P columns, to the radix-P operation units, and reading a $(P+1)^{th}$ block of K input operands from the input operand memory unit and buffering the $(P+1)^{th}$ block into a first column of the input buffer.

14. The method according to claim 11, wherein the following two actions are performed in a single clock cycle:

reading a $(2 \times P)^{th}$ block of K input operands from the input operand memory unit and buffering the $(2 \times P)^{th}$ block of K input operands into a $P^{th}$ column of the input buffer;

transferring K input operands from the first K/P lines of the input buffer.

15. The method according to claim 11, wherein the method comprises:

buffering operands processed by the radix-P operation units, into an output buffer having a plurality of addressable memory cells arranged in lines and columns;

writing processed operands from the output buffer into an output operand memory unit.

16. The method according to claim 11, wherein the input operand memory unit is a random-access memory unit.

17. The method according to claim 11, wherein the input buffer comprises a set of $K^2 - (K-4)^2$ individually addressable buffer cells, each cell being capable of buffering one input operand.

18. The method according to an claim 11, wherein K is a multiple of 4.

19. The method according to claim 11 wherein K is 8.

* * * * *